United States Patent
Tinker et al.

(10) Patent No.: US 7,515,156 B2
(45) Date of Patent: Apr. 7, 2009

(54) METHOD AND APPARATUS FOR PARALLEL SPECULATIVE RENDERING OF SYNTHETIC IMAGES

(75) Inventors: Peter Allmond Tinker, West Hills, CA (US); Mike Daily, Thousand Oaks, CA (US)

(73) Assignee: HRL Laboratories, LLC, Malibu, CA (US)

( * ) Notice: Subject to any disclaimer, the term of this patent is extended or adjusted under 35 U.S.C. 154(b) by 377 days.

(21) Appl. No.: 10/339,359

(22) Filed: Jan. 8, 2003

(65) Prior Publication Data

US 2004/0130549 A1  Jul. 8, 2004

(51) Int. Cl.
G06T 13/00 (2006.01)
G06T 15/70 (2006.01)
G06F 15/16 (2006.01)
G09G 5/00 (2006.01)
G06F 3/048 (2006.01)
G06F 15/80 (2006.01)

(52) U.S. Cl. .................. 345/474; 345/473; 345/475; 345/502; 345/505; 345/633; 715/757

(58) Field of Classification Search .......... 345/158, 345/473–475, 502, 505, 633; 302/103; 715/757
See application file for complete search history.

(56) References Cited

U.S. PATENT DOCUMENTS

| | | | | |
|---|---|---|---|---|
| 4,722,601 A | * | 2/1988 | McFarlane | 356/141.3 |
| 4,825,360 A | * | 4/1989 | Knight, Jr. | 718/106 |
| 5,053,760 A | * | 10/1991 | Frasier et al. | 345/473 |
| 5,424,942 A | * | 6/1995 | Dong et al. | 700/44 |
| 5,432,895 A | * | 7/1995 | Myers | 345/419 |
| 5,434,985 A | * | 7/1995 | Emma et al. | 712/240 |
| 5,453,799 A | * | 9/1995 | Yang et al. | 348/699 |
| 5,481,669 A | * | 1/1996 | Poulton et al. | 345/505 |

(Continued)

FOREIGN PATENT DOCUMENTS

JP  11305908 A  * 11/1999

OTHER PUBLICATIONS

C. Brown, "Kinematic and 3D Motion Prediction for Gaze Control", Nov. 1989, IEEE Interpretation of 3D Scenes, 1989. Proceedings., pp. 145-151.*

(Continued)

Primary Examiner—Ulka Chauhan
Assistant Examiner—Roberta Prendergast
(74) Attorney, Agent, or Firm—Cary Tope McKay

(57) ABSTRACT

A method, apparatus and computer program product for parallel speculative rendering of synthetic images in an image rendering system are presented. The operations include obtaining measurements regarding scene characteristics. The measurements are provided to predictors, each predicting a future state for a measurement. The future states are provided to a renderer that renders graphical entities, each rendering resulting from a different predicted future state. Subsequently, a new set of measurements is obtained regarding the scene characteristics. Then each measurement of the new set of measurements is compared with a corresponding one of the predicted future states produced by the predictors. The predicted future state that most closely matches with the new measurements is then selected. Then, the graphical entities associated with the predicted future state that most closely match with the new measurements are selected. The selected graphical entities displayed on a display device.

102 Claims, 5 Drawing Sheets

U.S. PATENT DOCUMENTS

| | | | | |
|---|---|---|---|---|
| 5,490,239 A * | 2/1996 | Myers | 345/581 |
| 5,504,918 A * | 4/1996 | Collette et al. | 712/29 |
| 5,590,063 A * | 12/1996 | Golio et al. | 702/64 |
| 5,592,401 A * | 1/1997 | Kramer | 702/153 |
| 5,614,954 A * | 3/1997 | Jung | 375/240.14 |
| 5,615,132 A * | 3/1997 | Horton et al. | 703/7 |
| 5,675,721 A * | 10/1997 | Freedman et al. | 345/502 |
| 5,724,499 A * | 3/1998 | Nishiyama et al. | 345/473 |
| 5,751,289 A * | 5/1998 | Myers | 345/419 |
| 5,815,411 A * | 9/1998 | Ellenby et al. | 702/150 |
| 5,848,276 A * | 12/1998 | King et al. | 710/200 |
| 5,862,261 A * | 1/1999 | Lee | 382/236 |
| 5,870,136 A * | 2/1999 | Fuchs et al. | 348/42 |
| 5,872,575 A * | 2/1999 | Segal | 345/473 |
| 5,991,447 A * | 11/1999 | Eifrig et al. | 382/236 |
| 6,064,749 A * | 5/2000 | Hirota et al. | 382/103 |
| 6,084,556 A * | 7/2000 | Zwern | 345/8 |
| 6,091,422 A * | 7/2000 | Ouaknine et al. | 345/419 |
| 6,127,990 A * | 10/2000 | Zwern | 345/8 |
| 6,181,345 B1 * | 1/2001 | Richard | 345/419 |
| 6,184,847 B1 * | 2/2001 | Fateh et al. | 345/8 |
| 6,243,106 B1 * | 6/2001 | Rehg et al. | 345/473 |
| 6,359,619 B1 * | 3/2002 | Waters et al. | 345/426 |
| 6,373,489 B1 * | 4/2002 | Lu et al. | 345/428 |
| 6,377,401 B1 * | 4/2002 | Bartlett | 359/630 |
| 6,426,752 B1 * | 7/2002 | Goden | 345/473 |
| 6,445,815 B1 * | 9/2002 | Sato | 382/154 |
| 6,487,516 B1 * | 11/2002 | Amorai-Moriya | 702/152 |
| 6,677,941 B2 * | 1/2004 | Lin | 345/419 |
| 6,681,031 B2 * | 1/2004 | Cohen et al. | 382/103 |
| 6,735,566 B1 * | 5/2004 | Brand | 704/256 |
| 6,867,753 B2 * | 3/2005 | Chinthammit et al. | 345/8 |
| 6,867,779 B1 * | 3/2005 | Doyle et al. | 345/502 |
| 6,983,283 B2 * | 1/2006 | Sowizrai et al. | 707/102 |
| 7,035,764 B2 * | 4/2006 | Rui et al. | 702/179 |
| 2003/0011788 A1 * | 1/2003 | Hoche | 356/614 |
| 2003/0014464 A1 * | 1/2003 | Deverill et al. | 709/101 |
| 2003/0065668 A1 * | 4/2003 | Sowizrai et al. | 707/100 |
| 2004/0051680 A1 * | 3/2004 | Azuma et al. | 345/8 |

OTHER PUBLICATIONS

R. Azuma, "A Survey of Augmented Reality,"Presence: Teleoperators and Virtual Environments, vol. 6, No. 4, 1997, pp. 355-385.*

S. You et al., "Hybrid Inertial and Vision Tracking for Augmented Reality Registration", Proceedings of the IEEE Virtual Reality, Mar. 1999, IEEE Computer Society, Washington, DC, pp. 1-8.*

R. Azuma et al., "A Motion-Stabilized Outdoor Augmented Reality System", Proceedings of the IEEE Virtual Reality, Mar. 1999, IEEE Computer Society, Washington, DC, 1-8.*

A. State et al., "Superior augmented reality registration by integrating landmark tracking and magnetic tracking" Proceedings of the 23rd Annual Conference on Computer Graphics and interactive Techniques, SIGGRAPH '96, ACM Press, NY, NY, pp. 429-438.*

E. Wes Bethel, Greg Humphreys, Brian Paul, J. Dean Brederson, "Sort-First, Distributed Memory Parallel Visualization and Rendering", Proceedings of the 2003 IEEE Symposium on Parallel and Large-Data Visualization and Graphics, p.7, Oct. 20-21, 2003.*

Matthew Eldridge, Homan Igehy, Pat Hanrahan, "Pomegranate: a fully scalable graphics architecture", Proceedings of the 27th annual conference on Computer graphics and interactive techniques, pp. 443-454, Jul. 2000.*

Henry Fuchs, John Poulton, John Eyles, Trey Greer, Jack Goldfeather, David Ellsworth, Steve Molnar, Greg Turk, Brice Tebbs, Laura Israel, Pixel-planes 5: a heterogeneous multiprocessor graphics system using processor-enhanced memories, ACM SIGGRAPH Computer Graphics, v.23, n.3, pp. 79-88, Jul. 1989.*

Greg Humphreys, Mike Houston, Ren Ng, Randall Frank, Sean Ahern, Peter D. Kirchner, James T. Klosowski, "Chromium: a stream-processing framework for interactive rendering on clusters", ACM Transactions on Graphics (TOG), v.21 n.3, Jul. 2002.*

Greg Humphreys, Ian Buck, Matthew Eldridge, Pat Hanrahan, Distributed rendering for scalable displays, Proceedings of the 2000 ACM/IEEE conference on Supercomputing (CDROM), p.30-es, Nov. 04-10, 2000, Dallas, Texas, United States.*

Greg Humphreys, Matthew Eldridge, Ian Buck, Gordan Stoll, Matthew Everett, Pat Hanrahan, "WireGL: a scalable graphics system for clusters", Proceedings of the 28th annual conference on Computer graphics and interactive techniques, pp. 129-140, Aug. 2001.*

Steven Molnar, John Eyles, John Poulton, PixelFlow: high-speed rendering using image composition, Proceedings of the 19th annual conference on Computer graphics and interactive techniques, pp. 231-240, Jul. 1992.*

N. Nandhakumar and J.K. Aggarwal, "Physics-based integration of multiple sensing modalities for scene interpretation," in Proceeding of the IEEE, vol. 85, No. 1, 1997, pp. 1470-2163.*

Tak et al., "Spacetime Sweeping: An Interactive Dynamic Constraints Solver", 2002, IEEE.*

Jian Yang, Jiaoying Shi, Zhefan Jin, Hui Zhang, Design and implementation of a large-scale hybrid distributed graphics system, Proceedings of the Fourth Eurographics Workshop on Parallel Graphics and Visualization, Sep. 09-10, 2002, Blaubeuren, Germany.*

Wagner T. Corrêa, James T. Klosowski, Cláudio T. Silva, Out-of-core sort-first parallel rendering for cluster-based tiled displays, Proceedings of the Fourth Eurographics Workshop on Parallel Graphics and Visualization, Sep. 09-10, 2002, Blaubeuren, Germany.*

* cited by examiner

METHOD AND APPARATUS FOR PARALLEL SPECULATIVE RENDERING OF SYNTHETIC IMAGES

BACKGROUND OF THE INVENTION (1) Technical Field

The present invention relates to techniques for registering components in computer-generated scenes. More specifically, the present invention relates to a technique for registering synthetic images of components by generating parallel predictions and selecting the most accurate prediction for display to a user.

(2) Discussion

In graphics systems that are required to produce images derived from changing data, in which the images must be produced as quickly as possible, current technologies suffer from registration accuracy-related drawbacks. One such example is that of head-tracked display systems that create images specific to a particular eye position, orientation, and field of view. Usually these parameters are supplied by sensors that measure an operator's head or gaze position and orientation. As the operator's head moves, the sensors feed updated parameters to the system so that new images can be created consistent with the new parameters. Since the image is usually synthetic, or contains synthetic elements, it takes time to construct. By the time the image reaches its ultimate display surface, there is some difference between the current sensor outputs and the parameters used to construct the image. Visually, the result is incorrect registration of synthetic components, which can result in confusion, nausea, and other undesirable physical and psychological effects.

Current systems for generating synthetic or augmented computer graphic scenes use a sequence of steps to produce an output image at the display device, as depicted in FIG. 1, which shows a typical sequence. In a sensing step 100, one or more sensors feed data, for example a viewer's eyepoint and gaze direction into a prediction module. Typical sensors used include magnetic, video, and inertial sensors. Next, in a predicting step 102, a predicting module attempts to predict a future value of the sensor data, such as what the eyepoint and gaze directions will be at the time the image is finally displayed. Typical predicting modules include, for example, Kalman filters as well as other behavioral and physical models. After the predicting step 102 has finished, a rendering step 104 is performed by a render module that creates an image in memory based on inputs from the predicting step 102. At the conclusion of rendering, in a warping step 106, new sensor inputs may be used to warp the image to adjust for small changes to the viewing parameters. The warping step 106 is typically performed by interpolating the image to match current information from the sensors. After the image has been sufficiently warped, a displaying step 108 is performed to produce an image on an output device. Most existing systems do not perform the predicting step 102 or the warping step 106, and simply attempt to keep up with the sensors as well as possible.

The technique depicted in FIG. 1 can work well if the prediction and warping modules produce good results, i.e., the correct future parameter values are predicted and the warping does not introduce noticeable visual artifacts and can be accomplished quickly. Unfortunately, these conditions are often not met, resulting in serious visual artifacts.

Accordingly, there exists a need in the art for a fast and reliable system for properly registering synthetic images of components at their proper locations in computer-generated scenes. Such a system would provide final images that closely match the current state of the sensors, thereby eliminating the undesirable physical and psychological side effects described above.

SUMMARY OF THE INVENTION

The present invention provides a method, apparatus, and computer product for parallel speculative rendering of synthetic images in an image rendering system. In the method aspect, steps are performed, including first obtaining measurements regarding scene characteristics. Next, a step is performed for providing the measurements to a plurality of predictors, for predicting, at each of the predictors, a future state for each of the measurements. Next, the future states are provided to a plurality of renderers. Each renderer renders graphical entities such that each rendering results from a different predicted future state. Next, a new set of measurements regarding the scene characteristics is obtained. At a comparator, each one of the new set of measurements is compared with a corresponding one of the predicted future states produced by the predictors. The predicted future state most closely matching with the new measurements is determined, and its associated graphical entities are selected. The graphical entities are then output for display on a display device.

In another aspect of the present invention, multiple predicting, providing, and rendering steps are performed, with each sequence of predicting, providing, and rendering steps performed substantially in parallel with respect to the others.

In still another aspect of the present invention, the parallel sequences of predicting, providing, and rendering steps are performed asynchronously with respect to each other.

In yet another aspect of present invention, the measurements are obtained from at least two sensors with each sensor selected from a group consisting of magnetic sensors, video sensors, position sensors, inertial sensors, databases, and computer networks.

In a further aspect of the present invention, each step of predicting is performed by predictors having a configuration selected from a group consisting of Kalman filters, sudden-stop and sudden-start models, and behavioral and physical models.

In another aspect present invention, the predictors predict values at a common future time.

In yet another aspect of the present invention, at least two predictors have the same configuration, and wherein the predictors produce output based on differing assumptions.

In a yet further aspect of the present invention, the predictors provide output having the same form as the measurements regarding the scene characteristics.

In another aspect of the present invention, in the step of rendering, for each renderer, there is an average of at least one predictor.

In still another aspect of the present invention, the step of comparing is performed by a simple weighted summing of value differences between the predicted future state and the new set of measurements.

In another aspect of the present invention, each predictor includes multiple prediction models along with a model that models the likelihood of each of the other models being accurate, where the method further comprises a step of selecting the model having the greatest likelihood of being accurate, and wherein the predicting step is performed using the model having the greatest likelihood of being accurate.

In a still further aspect of the present invention, in the step of comparing, a comparator is biased based on a combination of at least one biasing parameter selected from a group consisting of user-specified preferences, system-derived preferences, and a belief network in a predictor.

In another aspect the present invention, the step of selecting is performed by a switch configured to select a plurality of images for display in an environment selected from multi-image display environments and multi-user environments with multiple displays.

In yet another aspect of the present invention, the step of comparing, the step of rendering, and the step of switching are performed competitively as steps in a self-optimizing process subject to the following constraint:

$$\Delta t_d + \Delta t_p + \Delta t_r + \Delta t_c + \Delta t_s = T_p, \text{ where:}$$

$T_p$=total prediction time;

$\Delta t_d$=average time between data updates;

$\Delta t_p$=average time to perform one prediction;

$\Delta t_r$=average time to render one scene;

$\Delta t_c$=average time to compare all predicted states with the current state; and $\Delta t_s$=average time to switch between one candidate image and another.

In another aspect of the present invention, the predictors are configured to predict all possible future states and wherein the renderers are configured to render all possible future states.

In a further aspect of the present invention, the predictors are configured with a variety of prediction models, having a variety of processing speeds and a variety of qualities, so that a variety of predicted future states is available; whereby different models may be used depending on the speed and quality of prediction necessary.

In a still further aspect of the present invention, for each predictor, there is an average of more than one renderer.

In another aspect of the present invention, the predictors predict values at different future times.

In a yet further aspect of the present invention, the parallel sequences of predicting, providing, and rendering steps are performed synchronously with respect to each other.

It will be appreciated that the operations described above can be incorporated into a computer system or placed onto a computer readable medium as a computer program product without departing from the scope of what is taught. These aspects are considered within the scope of the present invention, as will be explained in greater detail in the detailed description below and in the accompanying claims.

BRIEF DESCRIPTION OF THE DRAWINGS

The objects, features and advantages of the present invention will be apparent from the following detailed descriptions of the preferred aspect of the invention in conjunction with reference to the following drawings.

DETAILED DESCRIPTION OF PREFERRED ASPECTS

Figure 1:
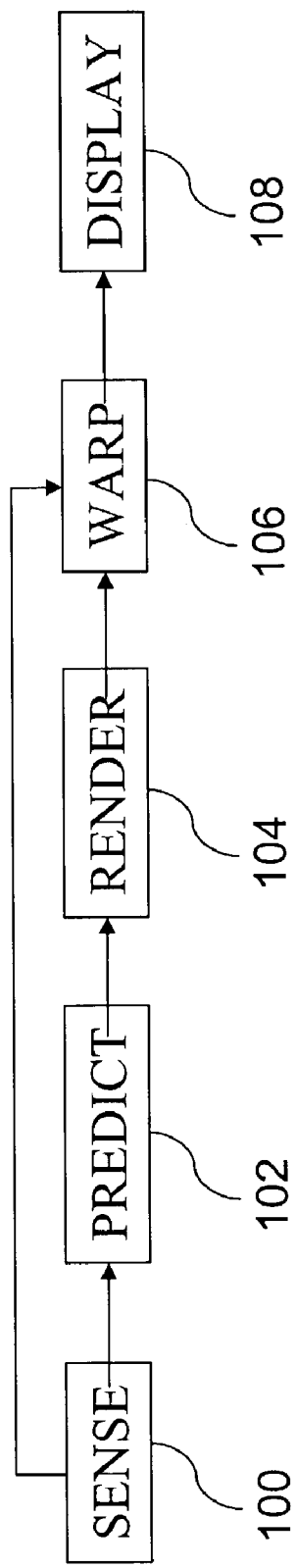
FIG. 1 is a block diagram depicting steps in a "traditional" prior art method of scene generation.

The present invention relates to techniques for registering components in computer-generated scenes. More specifically, the present invention relates to a technique for properly registering synthetic images of components by generating parallel predictions and selecting the most accurate prediction for display to a user. The following description, taken in conjunction with the referenced drawings, is presented to enable one of ordinary skill in the art to make and use the invention and to incorporate it in the context of particular applications. Various modifications, as well as a variety of uses in different applications, will be readily apparent to those skilled in the art, and the general principles defined herein, may be applied to a wide range of aspects. Thus, the present invention is not intended to be limited to the aspects presented, but is to be accorded the widest scope consistent with the principles and novel features disclosed herein. Furthermore it should be noted that unless explicitly stated otherwise, the figures included herein are illustrated diagrammatically and without any specific scale, as they are provided as qualitative illustrations of the concept of the present invention.

In order to provide a working frame of reference, first a glossary of terms used in the description and claims is given as a central resource for the reader. Next, a discussion of various physical aspects of the present invention is provided. Finally, a discussion is provided to give an understanding of the specific details.

(1) Glossary

Before describing the specific details of the present invention, a centralized location is provided in which various terms used herein and in the claims are defined. The glossary provided is intended to provide the reader with a feel for the intended meaning of the terms, but is not intended to convey the entire scope of each term. Rather, the glossary is intended to supplement the rest of the specification in more accurately explaining the terms used.

Graphics Component—As used herein, the phrase "graphics component" identifies information that directly or indirectly determines the appearance of all or part of a rendered image. Non-limiting examples include geometric models of physical objects, global and local lighting information, material properties, graphical representations of information (e.g., data used to populate a graph or diagram).

Means—In one context, the term "means" as used with respect to this invention generally indicates a set of operations to be performed on a computer, and may represent pieces of a whole program or individual, separable, software modules. Non-limiting examples of "means" include computer program code (source or object code) and "hard-coded" electronics (i.e. computer operations coded into a computer chip). The "means" may be stored in the memory of a computer or on a computer readable medium. In another context, the term "means" is used with hardware components to indicate a device that produces the function of the "means."

Scene Characteristics—As used herein, the phrase "scene characteristics" specifies the set of values that define a synthetic image, non-limiting examples of which include viewpoint, position, and orientation information, graphical entity position and orientation, spatial relationships among graphical entities, the representation of entities in the rendered image (e.g. in one measurement, a hand may be represented as a hand, while in another, it may be represented as another object such as a stick), and scene and entity color and lighting characteristics.

(2) Physical Aspects

The present invention has three principal "physical" aspects. The first is a system for properly rendering synthetic components in computer-generated images, typically in the form of a combination of a computer system operating software (possibly in the form of a "hard-coded" instruction set) and a dedicated graphical processor 206 such as a graphics card. This system may be incorporated into various devices, non-limiting examples including augmented reality systems, video games, and simulators, and may be coupled with a variety of sensors that provide information regarding the system state. The second physical aspect is a method, typically in the form of software, operated using a data processing system (computer). The third principal physical aspect is a computer program product. The computer program product generally represents computer readable code stored on a computer readable medium such as an optical storage device, e.g., a compact disc (CD) or digital versatile disc (DVD), or a magnetic storage device such as a floppy disk or magnetic tape. Other, non-limiting examples of computer readable media include hard disks, read only memory (ROM), and flash-type memories. These aspects will be described in more detail below.

Figure 2:
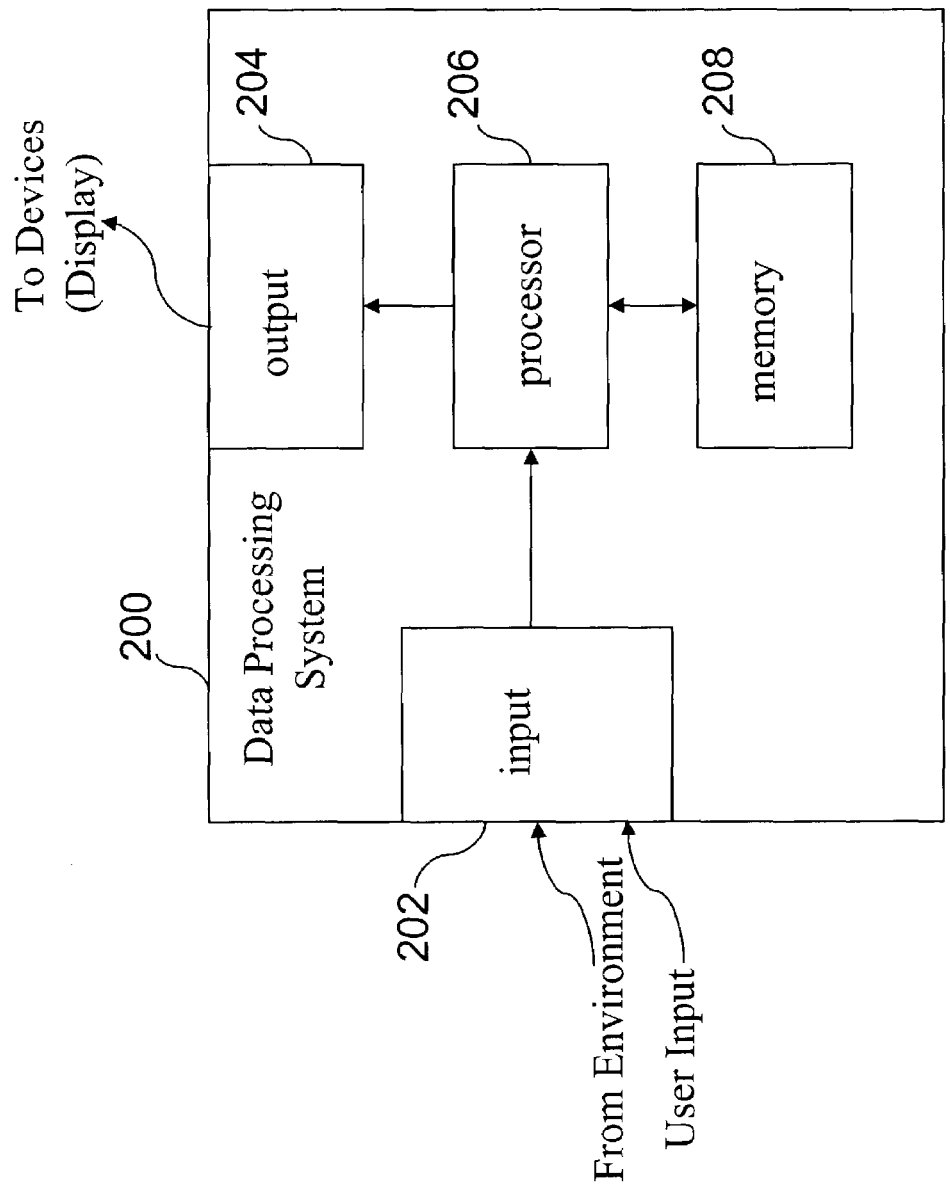
FIG. 2 is a block diagram of a computer system used in conjunction with the present invention.

A block diagram depicting the components of a computer system used in the present invention is provided in FIG. 2. The data processing system 200 comprises an input 202 for receiving information from at least one sensor for use in registering synthetic components. Note that the input 202 may include multiple ports. Typically, input is received from sensors such as CMOS and CCD vision sensors, magnetic sensors, inertial sensors, databases, and networks. The output 204 is connected with the processor 206 for providing information to other systems, such as a display (not shown) to display a scene with a properly registered synthetic component. Output may also be provided to other devices or other programs, e.g. to other software modules, for use therein. The input 202 and the output 204 are both coupled with a processor 206, which may be a general-purpose computer processor or a specialized processor designed specifically for use with the present invention. The processor 206 is coupled with a memory 208 to permit storage of data and software to be manipulated by commands to the processor. Depending on the requirements of a particular application, it is important to note that a plurality of computing devices may be used in combination. The specific configuration is understood to be adapted to a particular application, as will be readily understood by one of skill in the art.

Figure 3:
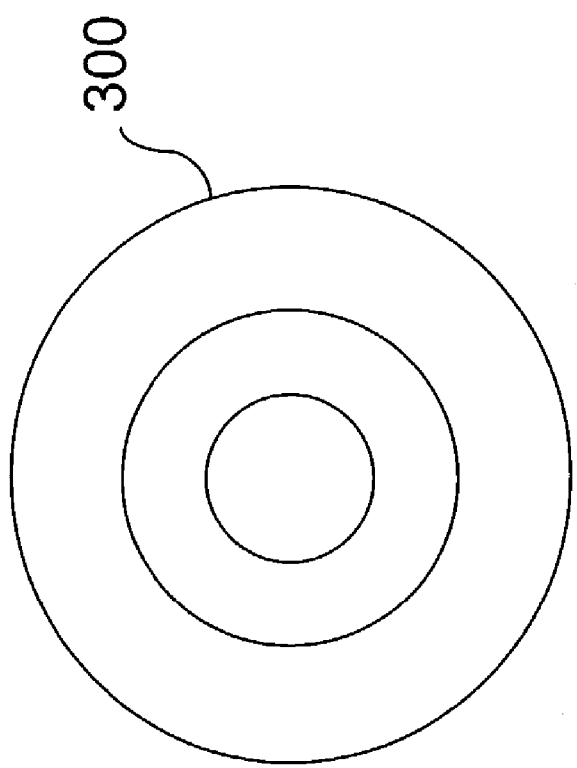
FIG. 3 is an example of a computer program product aspect of the present invention, in the form of a computer-readable medium.

An illustrative diagram of a computer program product embodying the present invention is depicted in FIG. 3. The computer program product 300 is depicted as an optical disk such as a CD or DVD. However, as mentioned previously, the computer program product generally represents computer readable code stored on any compatible computer readable medium.

(3) Introduction

Figure 4:
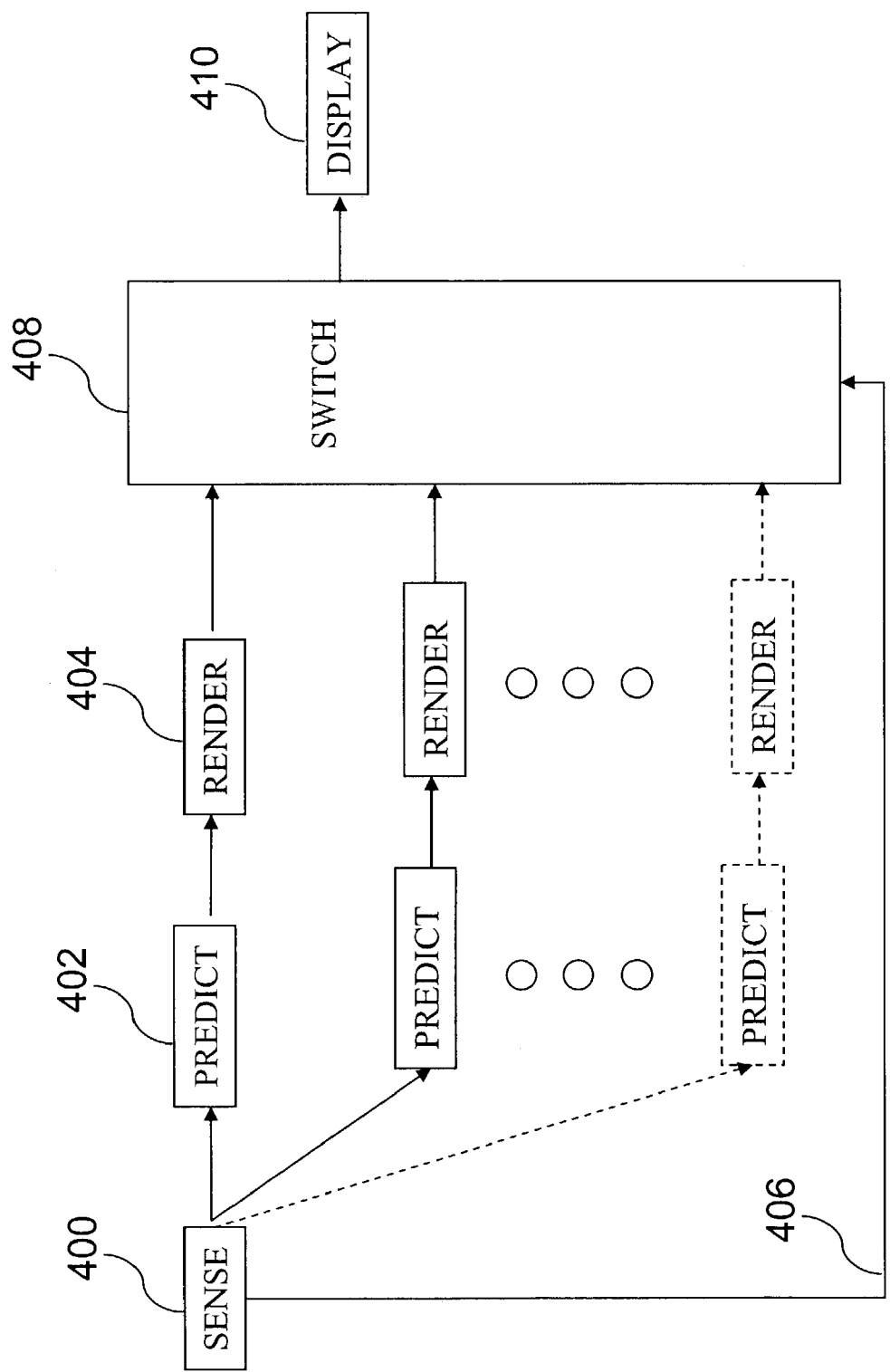
FIG. 4 is a block diagram depicting an aspect of the present invention with multiple parallel rendering processes.

The present invention replaces the "traditional" single sequence shown in FIG. 1 with multiple parallel sequences as shown in FIG. 4. Using multiple prediction models having differing parameters, multiple possible scenes are rendered in parallel on separate hardware platforms. When at least some renderers have finished rendering, current sensor values are compared with those implied by each prediction to determine the closest fit. The rendering that most closely matches current conditions is then selected. An electronically controlled switch then sends the single rendered image to the display.

Specifically, with regard to FIG. 4, a sensing step 400 is performed using at least one sensor. Non-limiting, but typical, sensor choices include magnetic sensors, such as compasses, video sensors such as CCD cameras, inertial sensors such as gyroscopes, and other sensors as appropriate for a particular application. After the sensing step has been performed, prediction steps 402 are performed in parallel based on the sensor information. The prediction steps 402 typically use different prediction models and/or different model parameters. Non-limiting, but typical, prediction model choices include Kalman filters and other behavioral and physical models. After at least some of the prediction steps 402 are complete, rendering steps 404 are performed to render scene for a user. In each rendering step 404, pixels of a rendered image are stored in a display buffer. The individual predicting steps 402 and the rendering steps 404 are performed substantially in parallel. However, the specific individual steps may vary in their particular execution time. Furthermore, the number of predicting step 402 and rendering step 404 pairs can be selected as desired for a particular apparatus, and may be variable even within the same apparatus by user command or by some other automatic selection process. After the rendering steps 404 have been completed, a second sensing step 406 is performed, and the results of the second sensing step 406 are compared with the results of the predicting steps 402 to determine which image resulted from the best prediction. A switching step 408 is then performed to gate this image for displaying 410 on a display device. It is also important to note that prediction may also involve parameters that affect the temporal use of rendered scene. In this case, the prediction and rendering may occur asynchronously and be available for display at variable rates depending on the needs of an application.

Furthermore, it is also worth noting that the present invention is not limited to the example described above, which may be used, for example, in head-tracking devices. Rather, the present invention can be used in any system that renders a sequence of images based on unpredictable dynamic inputs. The unpredictability may derive from sensors, as above, or for example, from changes in the simulated or real positions of components in a scene.

Thus, the present invention permits improved visual response to changes in information affecting graphic components. Also, it helps to make head-tracked displays more comfortable and accurate with less negative physical and psychological effects. The present invention will benefit any device that includes a gaze directed display. Examples may include future combat systems (FCS), airborne operator interfaces, and Augmented Reality (AR) and Virtual Reality (VR) displays. It will also benefit programs that attempt to visualize unpredictable dynamic situations, such as rapidly-changing battlespace visualizations, air traffic control (ATC) displays, immersive training, computer-guided assembly processes, and real-time military simulations. It can be used in the computer gaming industry to create images that more correctly correspond to player's commands. Also, for example, in automotive heads-up displays, it can increase the fidelity of the heads-up display to the current vehicle/driver situation. These examples represent only a few of the potential applications of the present invention that will be appreciated by those of skill in the art.

Figure 5:
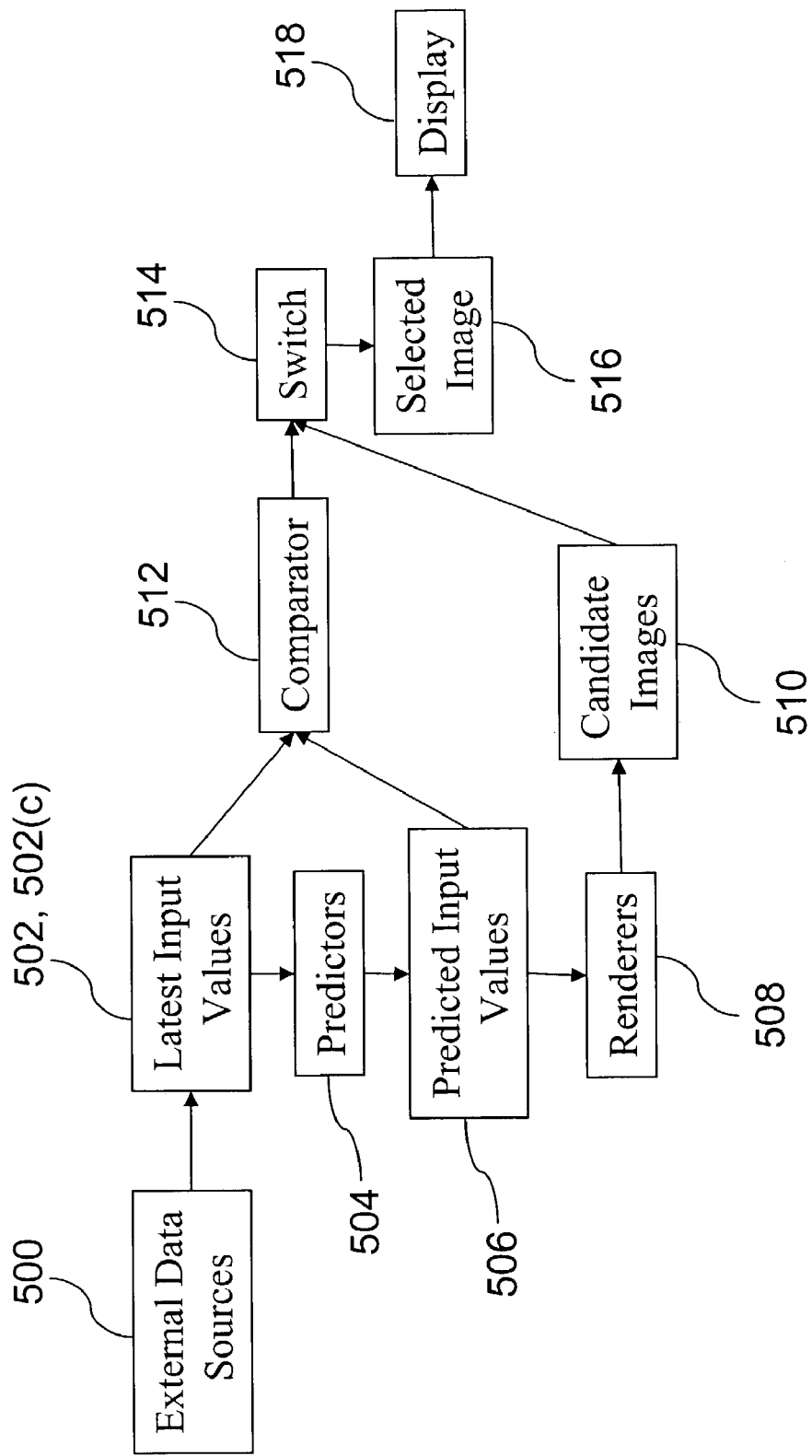
FIG. 5 is a block diagram depicting functional steps or modules of an aspect of the invention in greater detail.

A block diagram showing a more detailed aspect of the present invention is shown in FIG. 5. This block diagram depicts functional steps or modules of the present invention and is intended to provide the reader with a better understanding of its operations. First, data sources 500 provide information that affects graphical components, such as information about the physical environment. The data sources 500 typically include sensors as discussed previously. Note that the data sources 500 could include other types of "sensors" in the context of a videogame or simulator. The information may be provided, for example, by magnetic 6-degree of freedom (DOF) trackers, Global Positioning System (GPS) receivers, earth magnetic field sensors, or vision systems. The data sources 500 provide output to populate a data structure that represents the most up-to-date input values 502. These values are generally updated as quickly as the data sources 500 can provide them. The predictors 504, of which there are generally at least two for the invention to function properly, compute new sets of predicted input values 506 that represent hypothetical future values of the data sources 500. The predictors 504 generally operate in parallel, and possibly asynchronously, with each other. The predictors 504 can use a variety of methods to determine the hypothetical future values, non-limiting examples of which include Kalman filters, sudden-stop and sudden-start models, as well as knowledge of physical constraints on the data sources. All predictors 504 may provide predicted input values 506 at a common future time, or each may predict a different future time's values.

The predicted input values 506 result from predictors predicting future values of the input values based on different methods and assumptions. In some cases, there may be more predicted input values 506 than predictors (if predictors 504 act asynchronously and some take longer than others to produce output). In form, each set of predicted input values 506 is generally identical to the latest input values 502; they differ only in content. Although this qualification is not necessary, it makes the role of the comparator (discussed below) easier.

The renderers 508, of which there are generally at least two for the invention to function properly, compute new sets of candidate image values 510 that represent hypothetical future scenes. The renderers 508 generally operate in parallel, and possibly asynchronously with each other. Each renderer 508 can use the output from one predictor 504, or, depending on relative speeds, there may be M predictors 504 and N renderers 508, where M>1 and N>1 but M and N may have any relationship. As an example, in one manifestation of the invention, each renderer 508 might be a separate PC graphics card.

Each of the candidate images 510 produced by the renderers 508 is a single synthetic image of a scene rendered to the specifications of one prediction of future data source values. These are speculative images; that is, they correspond to possible future states, but only one will be selected for display. A premise of the present invention is the assumption that one candidate image 510 will be very close to the desired image (i.e., the image and all components in the image are properly registered), and expends some cost (risk) to increase the chances for success. Without this speculative rendering, the system would be forced to display an image derived from a single prediction of future input data sources values, and its success would depend wholly on the (single) predictor. Each candidate image 510 resides in an area of memory from which it can be read rapidly; if, for example, each renderer 508 is a separate PC graphics card, each candidate image 510 is made available at a card's output port.

At some time after the candidate images 510 have been created, of which there are generally at least two for the invention to function properly, a comparator 512 compares the (then or current) latest input values 502(c) with the values produced by the predictors 504 associated with each candidate image 510. A determination is made regarding which predicted values 506 are "closest" to the latest input values 502(c). This comparison may be a single weighted summing of value differences, or may be more complex method. Many such methods are available, as will readily be recognized by one of skill in the art. Note that element 502 is used to represent the latest input values from which the predictions are derived and that element 502(c) is used to represent the latest (or current) input values that are obtained for use in the comparator 512 to check against the predicted values 506 derived from the original latest input values 502.

When the comparator 512 has determined the best candidate image 510, based on predicted input values 506 that are closest to the actual latest input values 502(c), it activates a switch 514 to select that candidate image 510, which is then (for convenience) the selected image 516.

After the switch 514 has been activated, the selected image 516 is read from the candidate image storage. The selected image 516 is then displayed on a display medium 518, non-limiting examples of which include display monitors such as televisions, projectors, or other computer monitors and head-mounted displays.

In another aspect, the present invention can utilize more "intelligence" for the predictors 504, the comparator 512, and the switch 514. For example, the predicted input values 506 produced by the predictors 504 can be the result of a variety of models, including belief networks that model the likelihood of different outputs (and if desired, also prioritizing them), a rule-based system that models heuristic knowledge about behavior, or a model that tries to determine the theoretical or practical limit of possible viewpoints and gaze directions for one or more users (the latter is a brute-force approach that generate all possible scenes).

The predictors 504 might also be arranged in a hierarchical fashion, in which higher-level nodes predict using more primitive but faster methods than leaf-level predictors.

A more "intelligent" comparator 512 could, for example, be based on user specified preferences, system derived preferences, and/or a belief network from a predictor 504.

A "smart" switch 514 could, for example, select a set of images for display in a variety of conditions: a multi-image display environment like an immersive stereoscopic multi-screen or a multi-user environment with multiple display devices.

In yet another aspect, the predictors 504, the comparator 512, the renderers 508, and the switch 514 may be considered as competing components of a self-optimizing system. In this case, the number, sophistication, and time allotted to each component type would be controlled by an encompassing constraint function. This aspect is better understood with reference to the following example.

Let:

$T_s$=total speculating/rendering time;

$\Delta t_d$=average time between data updates;

$\Delta t_p$=average time to perform one prediction;

$\Delta t_r$=average time to render one scene;

$\Delta t_c$=average time to compare all predicted states with the current state; and $\Delta t_s$=average time to switch between one candidate image and another.

Using the "traditional" approach shown previously in FIG. 1, the average time to produce an image at the output following a change in input values is approximately $\Delta t_d + \Delta t_p + \Delta t_r = T_s$.

On the other hand, using the technique shown in FIG. 5, the time is approximately $\Delta t_d + \Delta t_p + \Delta t_r + \Delta t_c + \Delta t_s = T_p$. The difference between $T_s$ and $T_p$ is minimized when $\Delta t_c + \Delta t_s$ is minimized. Even if this quantity cannot be made very small ($\Delta t_s$ is limited by the refresh rate of the output display), the result of the new method is an output image that is generally much closer to the current data than the image produced by the "traditional" method of FIG. 1. This result also suggests that the predictors 504 should be configured to predict to a time $T_s$ in the future.

The overall performance of the system of the present invention may involve a trade-off between system utilization and accuracy. If predictions take a relatively long time, there will be fewer, generally more accurate, predictions and less overall parallelism leading to fewer candidate images 510. If, on the other hand, predictions are fast, the system may produce more predictions per unit time, enabling different predictions and prediction times (generally a greater amount of prediction time results in a greater degree of prediction accuracy or quality), resulting in more candidate images 510 from which to choose the best one.

What is claimed is:

1. A method for parallel speculative rendering of synthetic images in an image rendering system comprising steps of:
    obtaining measurements regarding scene characteristics;
    providing the measurements to a plurality of predictors;
    predicting, at each of the predictors, a future state for each of the measurements;
    providing the future states to a plurality of renderers;
    rendering, at each renderer, graphical entities such that each rendering results from a different predicted future state;
    obtaining a new set of measurements regarding the scene characteristics;
    comparing, at a comparator, each one of the new set of measurements with a corresponding one of the predicted future states produced by the predictors;
    determining which predicted future state most closely matches with the new measurements;
    selecting, at a switch, graphical entities associated with the predicted future state that most closely matches with the new measurements; and
    displaying the selected graphical entities on a display device;
    wherein providing the measurements to a plurality of predictors, the predictors are arranged in a hierarchical fashion having higher-level predictors and leaf-level predictors, and wherein predicting, the higher-level predictors predict at a faster rate than the leaf-level predictors.

2. A method as set forth in claim 1, wherein a plurality of predicting, providing, and rendering steps are performed, with each sequence of predicting, providing, and rendering steps performed substantially in parallel with respect to the others.

3. A method as set forth in claim 2, wherein the parallel sequences of predicting, providing, and rendering steps are performed asynchronously with respect to each other.

4. A method as set forth in claim 3, wherein the measurements are obtained from at least two sensors with each sensor selected from a group consisting of magnetic sensors, video sensors, position sensors, inertial sensors, databases, and computer networks.

5. A method as set forth in claim 4, wherein each step of predicting is performed by predictors having a configuration selected from a group consisting of Kalman filters, sudden-stop and sudden-start models, and behavioral and physical models.

6. A method as set forth in claim 5, wherein the predictors predict values at a common future time.

7. A method as set forth in claim 6, wherein at least two predictors have the same configuration, and wherein the predictors produce output based on differing assumptions.

8. A method as set forth in claim 7, wherein the predictors provide output having the same form as the measurements regarding the scene characteristics.

9. A method as set forth in claim 8, wherein in the step of rendering, for each renderer, there is an average of at least one predictor.

10. A method as set forth in claim 9, wherein the step of comparing is performed by a simple weighted summing of value differences between the predicted future state and the new set of measurements.

11. A method as set forth in claim 10, wherein in the step of predicting each predictor includes multiple prediction models along with a model that models a likelihood of each of the other models being accurate, and where the method further comprises a step of selecting the model having a greatest likelihood of being accurate, and wherein the predicting step is performed using the model having the greatest likelihood of being accurate.

12. A method as set forth in claim 11, wherein in the step of comparing, a comparator is biased based on a combination of at least one biasing parameter selected from a group consisting of user-specified preferences, system-derived preferences, and a belief network in a predictor.

13. A method as set forth in claim 12, wherein the step of selecting is performed by a switch configured to select a plurality of images for display in an environment selected from multi-image display environments and multi-user environments with multiple displays.

14. A method as set forth in claim 13, wherein the step of predicting, the step of comparing, the step of rendering, and the step of switching are performed competitively as steps in a self-optimizing process subject to the following constraint:

$$\Delta t_d + \Delta t_p + \Delta t_r + \Delta t_c + \Delta t_s = T_p, \text{ where:}$$

$T_p$=total prediction time;
$\Delta t_d$=average time between data updates;
$\Delta t_p$=average time to perform one prediction;
$\Delta t_r$=average time to render one scene;
$\Delta t_c$=average time to compare all predicted states with the current state; and
$\Delta t_s$=average time to switch between one candidate image and another.

15. A method as set forth in claim 10, wherein the predictors are configured to predict all possible future states and wherein the renderers are configured to render all possible future states.

16. A method as set forth in claim 10, wherein the predictors are configured with a variety of prediction models, having a variety of processing speeds and a variety of qualities, so that a variety of predicted future states is available; whereby different models may be used depending on the speed and quality of prediction necessary.

17. A method as set forth in claim 8, wherein for each predictor, there is an average of more than one renderer.

18. A method as set forth in claim 5, wherein the predictors predict values at different future times.

19. A method as set forth in claim 2, wherein the parallel sequences of predicting, providing, and rendering steps are performed synchronously with respect to each other.

20. A method as set forth in claim 1, wherein the measurements are obtained from at least two sensors with each sensor selected from a group consisting of magnetic sensors, video sensors, position sensors, inertial sensors, databases, and computer networks.

21. A method as set forth in claim 1, wherein each step of predicting is performed by predictors having a configuration selected from a group consisting of Kalman filters, sudden-stop and sudden-start models, and behavioral and physical models.

22. A method as set forth in claim 21, wherein the predictors predict values at a common future time.

23. A method as set forth in claim 22, wherein at least two predictors have the same configuration, and wherein the predictors produce output based on differing assumptions.

24. A method as set forth in claim 23, wherein the predictors provide output having the same form as the measurements regarding the scene characteristics.

25. A method as set forth in claim 24, wherein in the step of rendering, for each renderer, there is an average of at least one predictor.

26. A method as set forth in claim 25, wherein for each predictor, there is an average of more than one renderer.

27. A method as set forth in claim 21, wherein the predictors predict values at different future times.

28. A method as set forth in claim 1, wherein the step of comparing is performed by a simple weighted summing of value differences between the predicted future state and the new set of measurements.

29. A method as set forth in claim 28, wherein the predictors are configured with a variety of prediction models, having a variety of processing speeds and a variety of qualities, so that a variety of predicted future states is available; whereby different models may be used depending on the speed and quality of prediction necessary.

30. A method as set forth in claim 28, wherein the predictors are configured to predict all possible future states and wherein the renderers are configured to render all possible future states.

31. A method as set forth in claim 1, wherein in the step of predicting each predictor includes multiple prediction models along with a model that models a likelihood of each of the other models being accurate, and where the method further comprises a step of selecting the model having a greatest likelihood of being accurate, and wherein the predicting step is performed using the model having the greatest likelihood of being accurate.

32. A method as set forth in claim 1, wherein in the step of comparing, a comparator is biased based on a combination of at least one biasing parameter selected from a group consisting of user-specified preferences, system-derived preferences, and a belief network in a predictor.

33. A method as set forth in claim 1, wherein the step of selecting is performed by a switch configured to select a plurality of images for display in an environment selected from multi-image display environments and multi-user environments with multiple displays.

34. A method as set forth in claim 1, wherein the step of predicting, the step of comparing, the step of rendering, and the step of switching are performed competitively as steps in a self-optimizing process subject to the following constraint:

$$\Delta t_d + \Delta t_p + \Delta t_r + \Delta t_c + \Delta t_s = T_p, \text{ where:}$$

$T_p$=total prediction time;
$\Delta t_d$=average time between data updates;
$\Delta t_p$=average time to perform one prediction;
$\Delta t_r$=average time to render one scene;
$\Delta t_c$=average time to compare all predicted states with the current state; and
$\Delta t_s$=average time to switch between one candidate image and another.

35. An apparatus for parallel speculative rendering of synthetic images in an image rendering system, the apparatus comprising at least one computer, the computer comprising an input, a processor connected with the input, a memory connected with the processor, and an output connected with the processor, the computer further comprising means for performing operations of:
    obtaining measurements regarding scene characteristics;
    providing the measurements to a plurality of predictors;
    predicting, at each of the predictors, a future state for each of the measurements;
    providing the future states to a plurality of renderers;
    rendering, at each renderer, graphical entities such that each rendering results from a different predicted future state;
    obtaining a new set of measurements regarding the scene characteristics;
    comparing, at a comparator, each one of the new set of measurements with a corresponding one of the predicted future states produced by the predictors;
    determining which predicted future state most closely matches with the new measurements;
    selecting, at a switch, graphical entities associated with the predicted future state that most closely matches with the new measurements; and
    outputting the selected graphical entities;
    wherein providing the measurements to a plurality of predictors, the predictors are arranged in a hierarchical fashion having higher-level predictors and leaf-level predictors, and wherein predicting, the higher-level predictors predict at a faster rate than the leaf-level predictors.

36. An apparatus as set forth in claim 35, wherein a plurality of predicting, providing, and rendering means are provided so that each sequence of predicting, providing, and rendering operations is performed substantially in parallel with respect to the others.

37. An apparatus as set forth in claim 36, wherein the parallel sequences of predicting, providing, and rendering operations are performed asynchronously with respect to each other.

38. An apparatus as set forth in claim 37, wherein the measurements are obtained from at least two sensors with each sensor selected from a group consisting of magnetic sensors, video sensors, position sensors, inertial sensors, databases, and computer networks.

39. An apparatus as set forth in claim 38, wherein each operation of predicting is performed by predictors having a configuration selected from a group consisting of Kalman filters, sudden-stop and sudden-start models, and behavioral and physical models.

40. An apparatus as set forth in claim 39, wherein the predictors predict values at a common future time.

41. An apparatus as set forth in claim 40, wherein at least two predictors have the same configuration, and wherein the predictors produce output based on differing assumptions.

42. An apparatus as set forth in claim 41, wherein the predictors provide output having the same form as the measurements regarding the scene characteristics.

43. An apparatus as set forth in claim 42, wherein in the operation of rendering, for each renderer, there is an average of at least one predictor.

44. An apparatus as set forth in claim 43, wherein the operation of comparing is performed by a simple weighted summing of value differences between the predicted future state and the new set of measurements.

45. An apparatus as set forth in claim 44, wherein in the operation of predicting each predictor includes multiple prediction models along with a model that models a likelihood of each of the other models being accurate, and where the apparatus further comprises a operation of selecting the model having a greatest likelihood of being accurate, and wherein the predicting operation is performed using the model having the greatest likelihood of being accurate.

46. An apparatus as set forth in claim 45, wherein in the operation of comparing, a comparator is biased based on a combination of at least one biasing parameter selected from a group consisting of user-specified preferences, system-derived preferences, and a belief network in a predictor.

47. An apparatus as set forth in claim 46, wherein the operation of selecting is performed by a switch configured to select a plurality of images for display in an environment selected from multi-image display environments and multi-user environments with multiple displays.

48. An apparatus as set forth in claim 47, wherein the means for predicting, the means for comparing, the means for rendering, and the means for switching are run competitively as operations in a self-optimizing process subject to the following constraint:

$$\Delta t_d + \Delta t_p + \Delta t_r + \Delta t_c + \Delta t_s = T_p, \text{ where:}$$

$T_p$=total prediction time;
$\Delta t_d$=average time between data updates;
$\Delta t_p$=average time to perform one prediction;
$\Delta t_r$=average time to render one scene;
$\Delta t_c$=average time to compare all predicted states with the current state; and
$\Delta t_s$=average time to switch between one candidate image and another.

49. An apparatus as set forth in claim 44, wherein the predictors are configured to predict all possible future states and wherein the renderers are configured to render all possible future states.

50. An apparatus as set forth in claim 44, wherein the predictors are configured with a variety of prediction models, having a variety of processing speeds and a variety of qualities, so that a variety of predicted future states is available; whereby different models may be used depending on the speed and
quality of prediction necessary.

51. An apparatus as set forth in claim 42, wherein for each predictor, there is an average of more than one renderer.

52. An apparatus as set forth in claim 39, wherein the predictors predict values at different future times.

53. An apparatus as set forth in claim 36, wherein the parallel sequences of predicting, providing, and rendering operations are performed synchronously with respect to each other.

54. An apparatus as set forth in claim 35, wherein the measurements are obtained from at least two sensors with each sensor selected from a group consisting of magnetic sensors, video sensors, position sensors, inertial sensors, databases, and computer networks.

55. An apparatus as set forth in claim 35, wherein each operation of predicting is performed by predictors having a configuration selected from a group consisting of Kalman filters, sudden-stop and sudden-start models, and behavioral and physical models.

56. An apparatus as set forth in claim 55, wherein the predictors predict values at a common future time.

57. An apparatus as set forth in claim 56, wherein at least two predictors have the same configuration, and wherein the predictors produce output based on differing assumptions.

58. An apparatus as set forth in claim 57, wherein the predictors provide output having the same form as the measurements regarding the scene characteristics.

59. An apparatus as set forth in claim 58, wherein in the operation of rendering, for each renderer, there is an average of at least one predictor.

60. An apparatus as set forth in claim 58, wherein for each predictor, there is an average of more than one renderer.

61. An apparatus as set forth in claim 55, wherein the means for comparing operates by performing a simple weighted summing of value differences between the predicted future state and the new set of measurements.

62. An apparatus as set forth in claim 35, wherein the operation of comparing is performed by a simple weighted summing of value differences between the predicted future state and the new set of measurements.

63. An apparatus as set forth in claim 62, wherein the predictors are configured with a variety of prediction models, having a variety of processing speeds and a variety of qualities, so that a variety of predicted future states is available; whereby different models may be used depending on the speed and quality of prediction necessary.

64. An apparatus as set forth in claim 62, wherein the predictors are configured to predict all possible future states and wherein the renderers are configured to render all possible future states.

65. An apparatus as set forth in claim 35, wherein in the operation of predicting each predictor includes multiple prediction models along with a model that models a likelihood of each of the other models being accurate, and where the apparatus further comprises a means for selecting the model having a greatest likelihood of being accurate, and wherein the means for predicting uses the model having the greatest likelihood of being accurate.

66. An apparatus as set forth in claim 35, wherein in the operation of comparing, a comparator is biased based on a combination of at least one biasing parameter selected from a group consisting of user-specified preferences, system-derived preferences, and a belief network in a predictor.

67. An apparatus as set forth in claim 35, wherein the operation of selecting is performed by a switch configured to select a plurality of images for display in an environment selected from multi-image display environments and multi-user environments with multiple displays.

68. An apparatus as set forth in claim 35, wherein the operation of predicting, the operation of comparing, the operation of rendering, and the operation of switching are performed competitively as operations in a self-optimizing process subject to the following constraint:

$$\Delta t_d + \Delta t_p + \Delta t_r + \Delta t_c + \Delta t_s = T_p, \text{ where:}$$

$T_p$=total prediction time;
$\Delta t_d$=average time between data updates;
$\Delta t_p$=average time to perform one prediction;
$\Delta t_r$=average time to render one scene;
$\Delta t_c$=average time to compare all predicted states with the current state; and
$\Delta t_s$=average time to switch between one candidate image and another.

69. A computer program product for parallel speculative rendering of synthetic images in an image rendering system having stored on a computer-readable medium, means for performing operations of:
obtaining measurements regarding scene characteristics;
providing the measurements to a plurality of predictors;
predicting, at each of the predictors, a future state for each of the measurements;
providing the future states to a plurality of renderers;

rendering, at each renderer, graphical entities such that each rendering results from a different predicted future state;

obtaining a new set of measurements regarding the scene characteristics;

comparing, at a comparator, each one of the new set of measurements with a corresponding one of the predicted future states produced by the predictors;

determining which predicted future state most closely matches with the new measurements;

selecting, at a switch, graphical entities associated with the predicted future state that most closely matches with the new measurements; and displaying the selected graphical entities on a display device;

wherein providing the measurements to a plurality of predictors, the predictors are arranged in a hierarchical fashion having higher-level predictors and leaf-level predictors, and wherein predicting, the higher-level predictors predict at a faster rate than the leaf-level predictors.

70. A computer program product as set forth in claim 69, wherein a plurality of predicting, providing, and rendering operations are performed by a plurality of means for predicting, providing, and rendering, with each sequence of predicting, providing, and rendering operations performed substantially in parallel with respect to the others.

71. A computer program product as set forth in claim 70, wherein the parallel sequences of predicting, providing, and rendering operations are performed asynchronously with respect to each other.

72. A computer program product as set forth in claim 71, wherein the measurements are obtained from at least two sensors with each sensor selected from a group consisting of magnetic sensors, video sensors, position sensors, inertial sensors, databases, and computer networks.

73. A computer program product as set forth in claim 72, wherein each operation of predicting is performed by predictors having a configuration selected from a group consisting of Kalman filters, sudden-stop and sudden-start models, and behavioral and physical models.

74. A computer program product as set forth in claim 73, wherein the predictors predict values at a common future time.

75. A computer program product as set forth in claim 74, wherein at least two predictors have the same configuration, and wherein the predictors produce output based on differing assumptions.

76. A computer program product as set forth in claim 75, wherein the predictors provide output having the same form as the measurements regarding the scene characteristics.

77. A computer program product as set forth in claim 76, wherein in the operation of rendering, for each renderer, there is an average of at least one predictor.

78. A computer program product as set forth in claim 77, wherein the operation of comparing is performed by a simple weighted summing of value differences between the predicted future state and the new set of measurements.

79. A computer program product as set forth in claim 78, wherein in the operation of predicting each predictor includes multiple prediction models along with a model that models a likelihood of each of the other models being accurate, and where the computer product further comprises a operation of selecting the model having a greatest likelihood of being accurate, and wherein the predicting operation is performed using the model having the greatest likelihood of being accurate.

80. A computer program product as set forth in claim 79, wherein in the operation of comparing, a comparator is biased based on a combination of at least one biasing parameter selected from a group consisting of user-specified preferences, system-derived preferences, and a belief network in a predictor.

81. A computer program product as set forth in claim 80, wherein the operation of selecting is performed by a switch configured to select a plurality of images for display in an environment selected from multi-image display environments and multi-user environments with multiple displays.

82. A computer program product as set forth in claim 81, wherein the operation of predicting, the operation of comparing, the operation of rendering, and the operation of switching are performed competitively as operations in a self-optimizing process subject to the following constraint:

$$\Delta t_d + \Delta t_p + \Delta t_r + \Delta t_c + \Delta t_s = T_p, \text{ where:}$$

$T_p$=total prediction time;
$\Delta t_d$=average time between data updates;
$\Delta t_p$=average time to perform one prediction;
$\Delta t_r$=average time to render one scene;
$\Delta t_c$=average time to compare all predicted states with the current state; and
$\Delta t_s$=average time to switch between one candidate image and another.

83. A computer program product as set forth in claim 78, wherein the predictors are configured to predict all possible future states and wherein the renderers are configured to render all possible future states.

84. A computer program product as set forth in claim 78, wherein the predictors are configured with a variety of prediction models, having a variety of processing speeds and a variety of qualities, so that a variety of predicted future states is available; whereby different models may be used
depending on the speed and quality of prediction necessary.

85. A computer program product as set forth in claim 76, wherein for each predictor, there is an average of more than one renderer.

86. A computer program product as set forth in claim 73, wherein the predictors predict values at different future times.

87. A computer program product as set forth in claim 70, wherein the parallel sequences of predicting, providing, and rendering operations are performed synchronously with respect to each other.

88. A computer program product as set forth in claim 69, wherein the measurements are obtained from at least two sensors with each sensor selected from a group consisting of magnetic sensors, video sensors, position sensors, inertial sensors, databases, and computer networks.

89. A computer program product as set forth in claim 69, wherein each operation of predicting is performed by predictors having a configuration selected from a group consisting of Kalman filters, sudden-stop and sudden-start models, and behavioral and physical models 90. A computer program product as set forth in claim 89, wherein the predictors predict values at a common future time.

91. A computer program product as set forth in claim 90, wherein at least two predictors have the same configuration, and wherein the predictors produce output based on differing assumptions.

92. A computer program product as set forth in claim 91, wherein the predictors provide output having the same form as the measurements regarding the scene characteristics.

93. A computer program product as set forth in claim 92, wherein in the operation of rendering, for each renderer, there is an average of at least one predictor.

94. A computer program product as set forth in claim 92, wherein for each predictor, there is an average of more than one renderer.

95. A computer program product as set forth in claim 89, wherein the operation of comparing is performed by a simple weighted summing of value differences between the predicted future state and the new set of measurements.

96. A computer program product as set forth in claim 69, wherein the operation of comparing is performed by a simple weighted summing of value differences between the predicted future state and the new set of measurements.

97. A computer program product as set forth in claim 96, wherein the predictors are configured with a variety of prediction models, having a variety of processing speeds and a variety of qualities, so that a variety of predicted future states is available; whereby different models may be used depending on the speed and quality of prediction necessary.

98. A computer program product as set forth in claim 96, wherein the predictors are configured to predict all possible future states and wherein the renderers are configured to render all possible future states.

99. A computer program product as set forth in claim 69, wherein in the operation of predicting each predictor includes multiple prediction models along with a model that models a likelihood of each of the other models being accurate, and where the computer program product further comprises a operation of selecting the model having a greatest likelihood of being accurate, and wherein the predicting operation is performed using the model having the greatest likelihood of being accurate.

100. A computer program product as set forth in claim 69, wherein in the operation of comparing, a comparator is biased based on a combination of at least one biasing parameter selected from a group consisting of user-specified preferences, system-derived preferences, and a belief network in a predictor.

101. A computer program product as set forth in claim 69, wherein the operation of selecting is performed by a switch configured to select a plurality of images for display in an environment selected from multi-image display environments and multi-user environments with multiple displays.

102. A computer program product as set forth in claim 69, wherein the operation of predicting, the operation of comparing, the operation of rendering, and the operation of switching are performed competitively as operations in a self-optimizing process subject to the following constraint:

$$\Delta t_d + \Delta t_p + \Delta t_r + \Delta t_c + \Delta t_s = T_p, \text{ where:}$$

$T_p$ = total prediction time;
$\Delta t_d$ = average time between data updates;
$\Delta t_p$ = average time to perform one prediction;
$\Delta t_r$ = average time to render one scene;
$\Delta t_c$ = average time to compare all predicted states with the current state; and
$\Delta t_s$ = average time to switch between one candidate image and another.

* * * * *